Patented Nov. 6, 1951

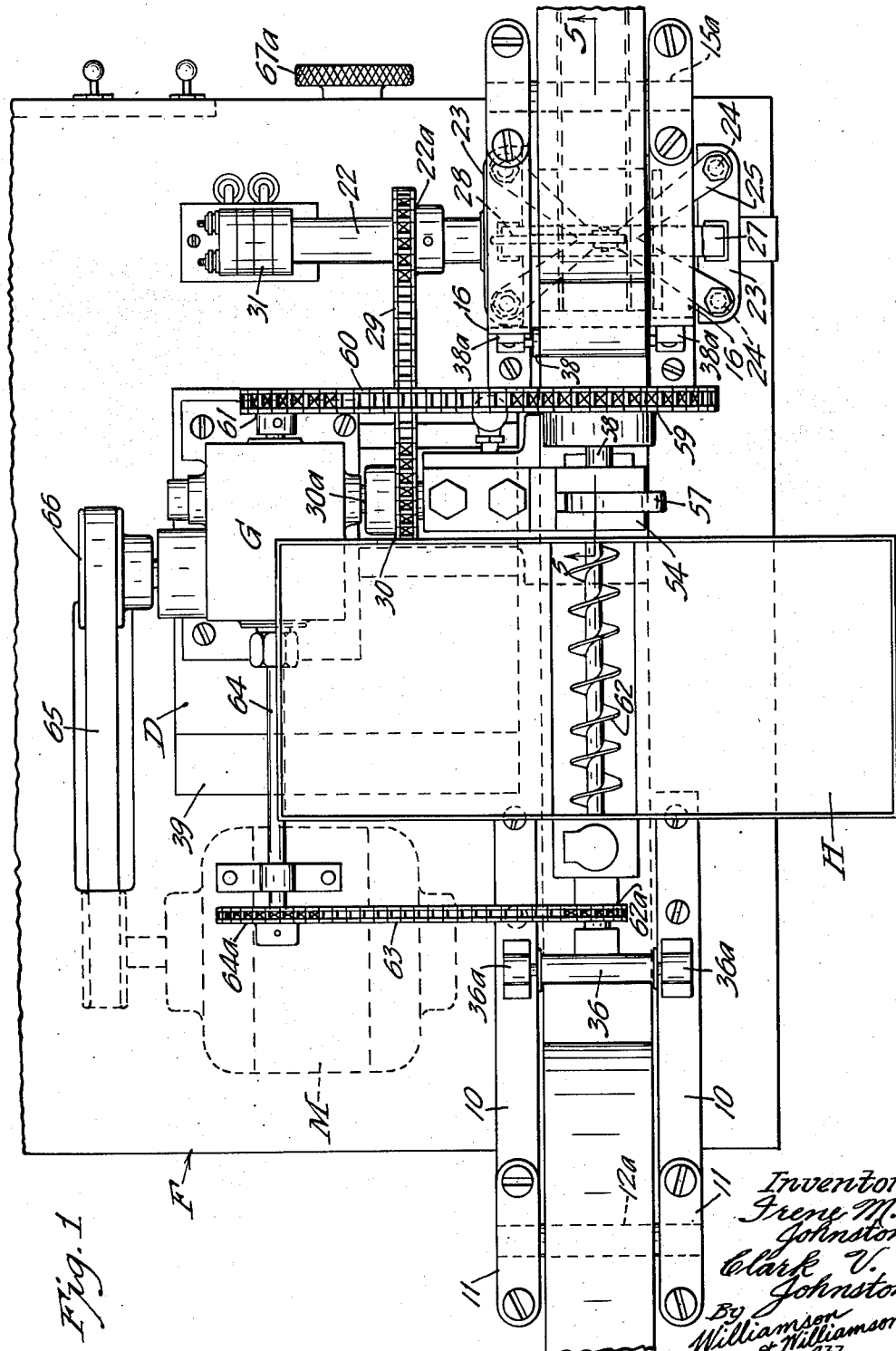

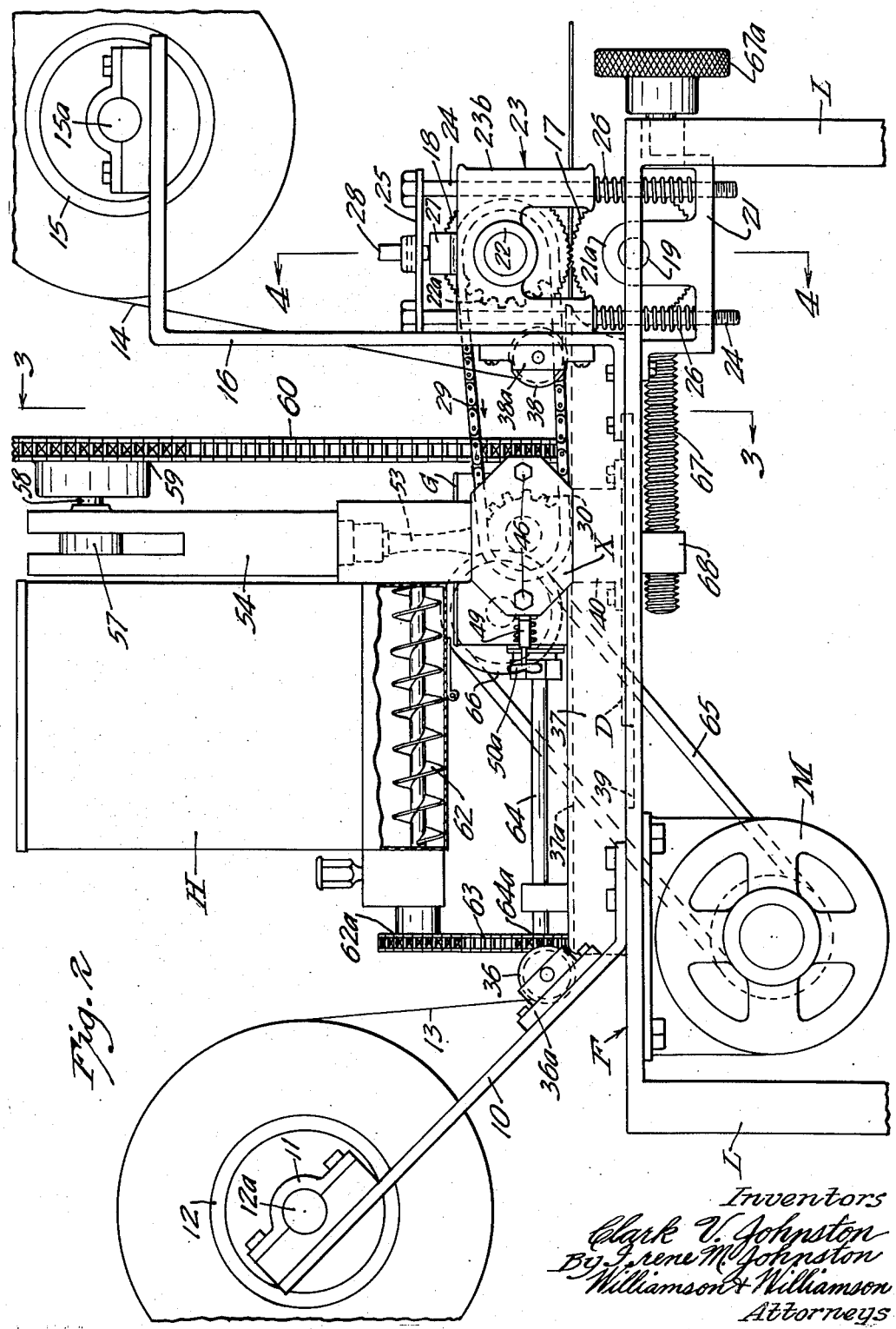

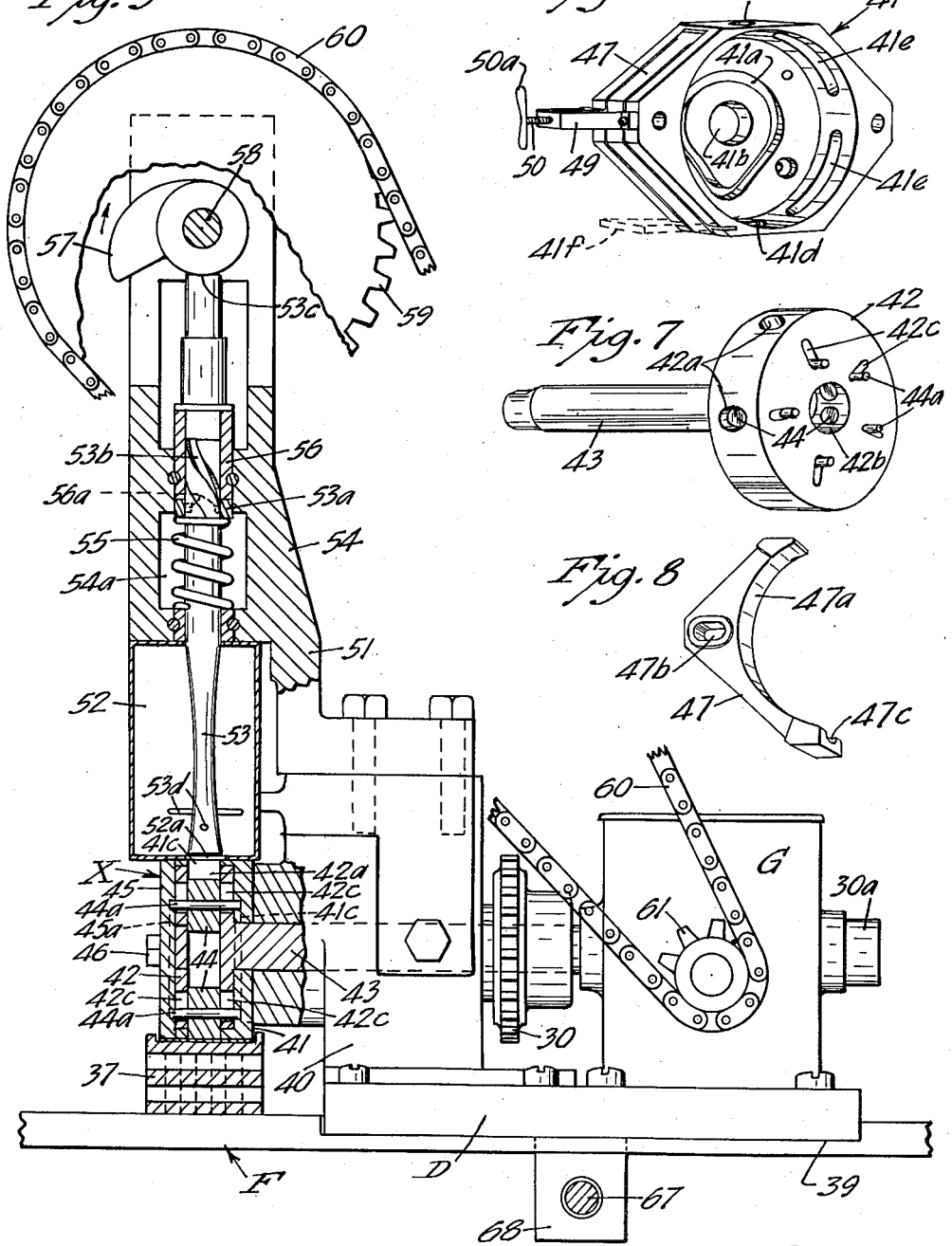

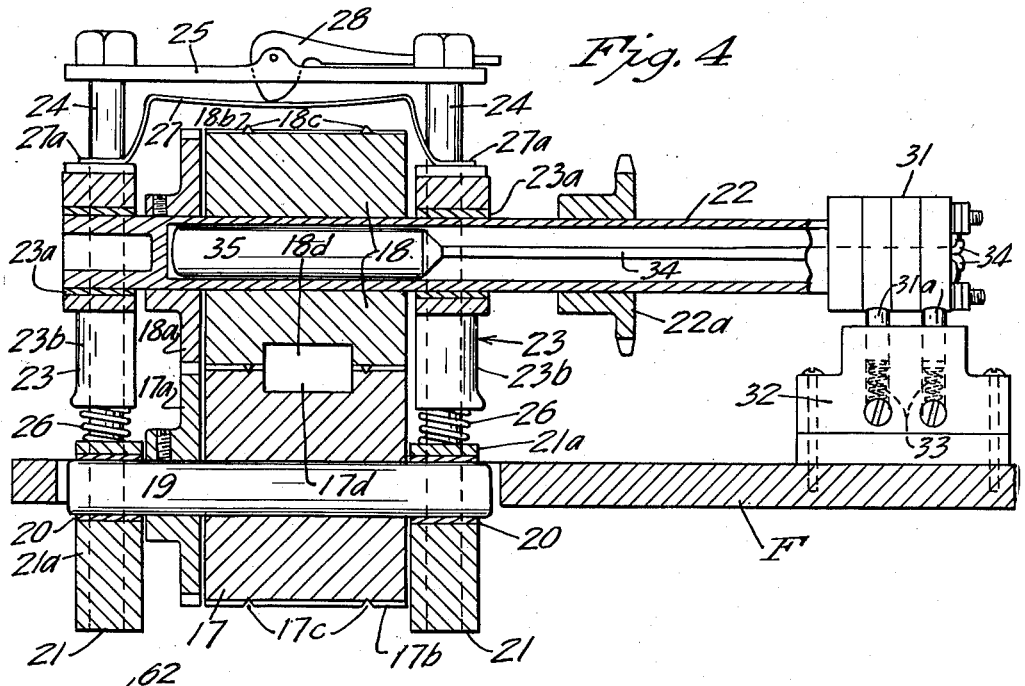
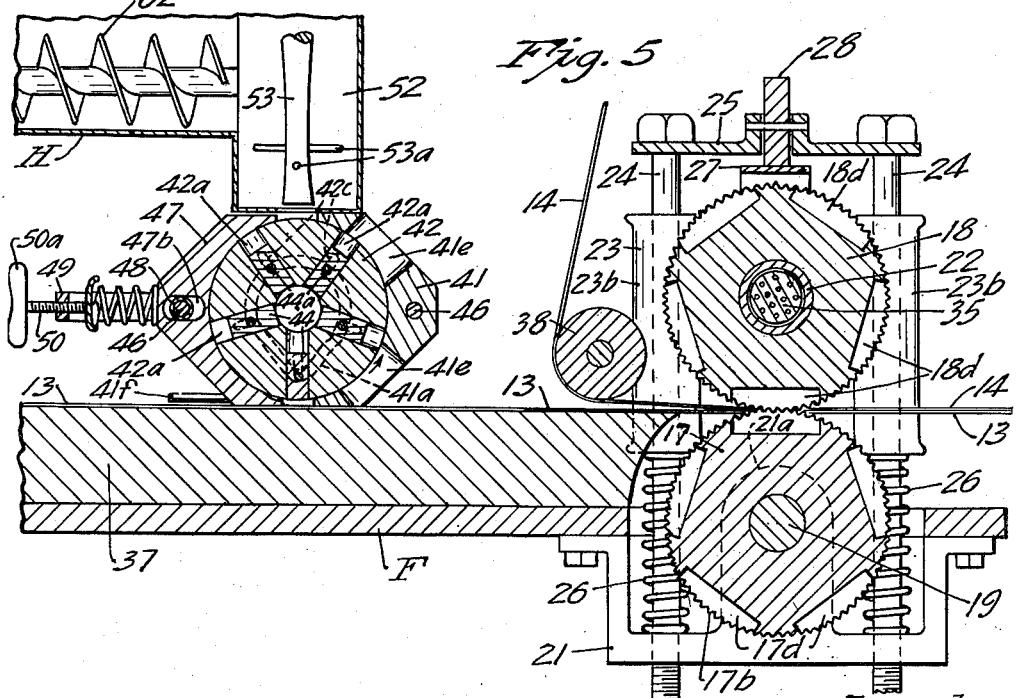

2,573,711

UNITED STATES PATENT OFFICE 2,573,711

MACHINE FOR MEASURING AND DISPENSING GRANULAR MATERIAL

Clark V. Johnston and Irene M. Johnston, Backus, Minn.

Application December 29, 1945, Serial No. 638,300

3 Claims. (Cl. 93—3)

This invention relates to the dispensing and film packaging of measured quantities of granular and comminuted material and particularly, to both a method and apparatus adapted for high capacity and continuous operation.

It is an object of our invention to provide a commercially successful method and machine for continuously measuring, dispensing and seal-packaging predetermined quantities of granular and comminuted material within sealed pockets formed between two continuous strips of thin, substantially impervious film.

A further object is the provision of a method and apparatus for continuously feeding, tensioning and synchronizing the travel of two continuous strips of film; measuring and depositing upon a horizontally disposed portion of one of said strips and in uniformly spaced relation thereon, predetermined quantities of comminuted or granulated material and thereafter, superimposing the second strip of film material in continuous operation, over the first strip of film material, with the measured quantities of material deposited thereon and thereafter, adhering the opposing surfaces of said strips together about the spaced deposits forming sealed pockets wherein the measured material is packaged.

Another object is the provision in a machine of the class described, of highly efficient rotary mechanism for receiving and accurately measuring and dispensing upon a moving film, predetermined quantities of granular or comminuted material and wherein the deposits are dense and uniform in shape and uniformly spaced on the moving film.

A still further object is the provision of a continuous, operating machine of the class described, wherein compensation and adjustment is provided for variance in stretchability and texture of the film material utilized as well as adjustment in the measuring and dispensing mechanism for materials varying in texture and size.

Still another object is the provision of a commercially successful machine of the class described, having an improved crimping and sealing action between two aligned films of material and providing for very accurate film packaging and sealing of the material deposited upon one of the films.

More specifically, it is an object in a machine of the class described, to provide cooperating crimping rolls having the dual functions of uniformly pulling and moving the two strips of film material utilized in synchronization with the measuring and dispensing mechanism and also, crimping and sealing the two strips into seal film packages.

Another object is the provision in such a machine of rotary measuring and dispensing mechanism having a series of radially arranged measuring cylinders and having pistons working in said cylinders actuated through cam action by the revolution of said rotor to positively expel successively in uniformly spaced relationship, predetermined deposits of the material upon the travelling film.

These and other objects and advantages of our invention will be more apparent from the following description made in connection with the accompanying drawings wherein like reference characters refer to the same parts throughout the several views and in which:

Fig. 1 is a plan view of an embodiment of our machine;

Fig. 2 is a side elevation of the same;

Fig. 3 is a cross section taken on the line 3—3 of Fig. 2 looking in the direction of the arrows and with portions broken away to show the construction of the charging, measuring and dispensing mechanism;

Fig. 4 is a cross section taken on the line 4—4 of Fig. 2 looking in the direction of the arrows and showing the heated crimping mechanism;

Fig. 5 is a vertical section taken longitudinally of the machine along the jogged line 5—5 of Fig. 1;

Fig. 6 is a perspective view showing the housing for the measuring and dispensing mechanism;

Fig. 7 is a perspective view showing the rotor of the measuring and dispensing mechanism; and Fig. 8 is a perspective view showing an adjustable scraper element associated with the dispenser.

Referring now to the embodiment of our invention illustrated in the accompanying drawings, the several cooperating mechanisms are supported upon a horizontal rectangular frame designated as an entirety by the letter F which as shown, is in turn supported upon four vertical legs L.

Mounted at one corner of the frame F and extending upwardly and rearwardly therefrom is a rigid film-holding bifurcated bracket 10 carrying at its upper end, a pair of split bearings 11 in which the trunnions 12a of a film spool 12 are journaled. The film 13 in the form of a helical roll is constructed from highly flexible material with requisite tensile strength and having a low degree of stretchability. Cellophane film or a film strip made from certain types of thin paper sized with paraffin or other waterproof, substantially impervious material, are suitable. A second helical roll of film 14 constructed of similar material mounted on a film spool 15 is vertically aligned with the roll of film 13 and is mounted on an inverted L-shaped, bifurcated bracket 16 attached to the right hand corner of frame F, split bearings 15a being provided to journal the trunnions of the film spool 15 and to permit adjustment of tension through variation of the friction imposed by said bearings.

A pair of vertically aligned, cooperating crimping and film-pulling rolls 17 and 18 respectively, are mounted as shown, on the right hand corner of frame F, substantially aligned vertically with the film spools 12 and 15. The lower of said rolls 17 (see Figs. 4 and 5) is mounted on a fixed axis by a transverse, horizontal shaft 19 journaled in suitable bearings 20 carried by a pair of horizontally aligned upstanding lugs 21a provided by small subframe member 21 attached beneath the main frame F. The upper roll 18 is mounted for limited floating action relative to roll 17 and to this end, is fixed to an elongated, hollow shaft 22 vertically aligned with shaft 19 of the roll 17 and journaled in suitable bearings 23a mounted in floating supporting brackets 23 which are disposed at the respective ends of the rolls and which each have a pair of spaced vertical sleeves 23b slidably mounted on vertical slide rods 24 suitably affixed at their lower ends to subframe 21 outwardly of the roll 17 and connected at their upper ends by a skeleton spanning frame 25. Vertical coil springs 26 are mounted on the lower portions of vertical slide rods 20 interposed between the lower ends of the sleeve 23b of the mounting brackets and the base of the small subframe 21. A counter resilient effect as shown at the top of the brackets 23, is obtained through a spanning leaf spring 27 having a medial raised portion and pressure-applying outer legs 27a which engage against the medial top portions of the two roll supporting brackets 23. Pressure is applied to the medial portion of leaf spring 27 as shown, by means of a cam lever 28 pivoted to the central portion of skeleton spanning frame 25 with its camming end working through a suitable recess in said spanning frame.

The upper crimping roll 18 is driven as shown, by a chain and sprocket connection between the tubular axle shaft 22 thereof and a power take-off sprocket 30 affixed to transversely extending shaft 30a which is mounted in a transmission or gear case indicated as an entirety by the letter G. As shown, an endless chain 29 is trained about power sprocket 30 and a sprocket 22a fixed to the intermediate portion of the extended tubular shaft 22. The lower roll 17 is driven from the left hand end by the upper roll shaft 22 as shown, by means of meshed gears 18a and 17a respectively affixed to the appropriate ends of the upper roll shaft 22 and lower roll shaft 19. Gears 17a and 18a have meshed teeth of proper length and configuration to allow for limited floating action of the upper roll 18 without disconnecting the meshed relationship of the two gears.

The projecting end of hollow roll shaft 22 is journaled in a floating bearing 31 mounted as shown, upon floating vertical legs 31a which are slidably mounted in vertical sockets of a base 32, coil springs 33 being interposed between the lower ends of legs 31a and the bottoms of said sockets. Bearing 31 is further utilized as a mounting for electrical conductors 34 which extend longitudinally through the tubular shaft 22 and are electrically connected with a heating element 35 axially mounted on tubular shaft 22 within the core portion of the upper roll 18 for heating the same.

The two rolls 17 and 18 have peripheral crimping surfaces, being each provided with a multiplicity of circumferentially arranged, longitudinally extending crimping ribs 17b and 18b respectively of V-shaped cross section, the ribs of the two rolls in operation being intermeshed to effect zigzag, transverse crimping of the two films into a unitary, two-ply strip. The upper roll 18, as shown on its periphery, is provided with a pair of widely spaced, circumferential crimping ribs 18c spaced inwardly from the two ends thereof and of somewhat greater height than the longitudinal ribs 18b and which are adapted to be seated in complementary shaped, circumferential, spaced crimping channels 17c formed in the lower crimping roll 17.

In addition to the crimping elements described the two rolls 17 and 18 are each provided in the medial portions thereof with a series of uniformly spaced, circular concaved pockets 17d and 18d respectively, the corresponding pockets of the two rolls being adapted to precisely register at the tangential portions of the rolls in operation, and in combination, being adapted to accommodate the deposits of material interposed in predetermined relationship between the two films 13 and 14.

The lower film 13 is trained beneath a transversely disposed guide roller 36 mounted in suitable bearings 36a a short distance above the frame F on bifurcated bracket 10, the lower periphery of said guide roller being substantially horizontally aligned with the tangential portions of crimping rolls 17 and 18 whereby the film is drawn horizontally from guide roller 36 into the crimping rolls, being supported throughout most of its horizontal travel upon a stationary deck or platen 37 fixed longitudinally to the forward side of the machine and extending with its longitudinal center in vertical alignment with the longitudinal centers of film 13 and the medial circumferences of crimping rolls 17 and 18 and of guide rollers 36. The platen 37 has a smooth top, film receiving surface but is preferably in cross section of cellular construction to quickly dissipate any heat transmitted thereto.

The upper film strip 14 is guided first, downwardly from the spool 15 and then nearly horizontally in slight convergence with the lower horizontally disposed film 13 into the tangential crimping portions of rolls 17 and 18. This, as shown, is accomplished by a transversely disposed guiding roll 38 mounted in suitable bearings 38a attached to the bifurcated mounting bracket 16 for the spool 15 and disposed a short distance above the main frame F.

The parts of the machine previously described, with the exception of the transmission or gear case G, are supported upon the frame F or the stationary small subframe 21. A number of mechanisms of our device to be described and including the gear case G, are mounted upon a longitudinally adjustable, horizontal bed plate or deck D slidably supported upon rabbeted horizontal guides 39 extending longitudinally and provided by the frame F.

Upon the right hand portion of the adjustable bed plate D and overhanging the tensioned horizontal portion of strip 13 above platen 37, we mount a combined charging, measuring and dispensing mechanism indicated as an entirety by the letter X and as shown, being mounted on bed plate D forwardly of the mounting of gear case by means of a suitable overhanging supporting bracket 40.

Mechanism X, as clearly shown in Figs. 3, 6 and 7, includes a vertical casing 41 as shown, of generally octagonal configuration having a cylindrical bore formed through the outer face thereon for accommodation of a measuring and dispensing rotor 42 illustrated in Fig. 7. The rotor 42 is fixed or integrally formed upon the outer end of a stub shaft 43 which is suitably journaled in the upstanding supporting bracket 40 and longitudinally and drivably connected with the power takeoff shaft 30a mounted in gear casing G. The measuring and dispensing rotor 42 is provided with a series of uniformly spaced, radial passages 42a therein extending from the periphery of the rotor to a central axial bore 42b formed therein and defining as shown, six material-holding cylinders. Slidably mounted in each of these cylinders is a piston 44 closely fitting the cylindrical wall in each instance with close working clearance and each having a diametric guide pin 44a which extends at opposite sides of the piston through radial guide slots 42c formed through the front and rear faces of the rotor 42 and of such length and arrangement to limit the outward strokes of pistons 44 to positions substantially flush with the periphery of rotor 42 and to limit the inner strokes to the positions shown with reference to two of the pistons in Fig. 7. A heart shaped cam channel or track 41a is formed in the inner end of the counter bored cylinder of casing 41 in which the projecting ends of diametric guide pins 44a of the rotor are seated. The casing 41 is provided with an axial bore 41b in which the shaft 43 of the rotor is journaled. A vertical casing cover or plate 45 is secured to the outer face of casing 41 enclosing the rotor and is provided with a heart shaped cam channel 45a in the inner face thereof wherein the guide pins 44a of the rotor, extending beyond the outer face of the rotor, are seated and guided for reciprocation of the pistons 44. Plate 45 is secured to casing 41 as shown, by a pair of heavy bolts 46 and the left hand of said bolts as shown, is also utilized to anchor an adjustable casing segment 47 (see Fig. 8) at one side of casing 41. To accommodate segment 47 the left end thereof is vertically slotted through the peripheral wall thereof and the arcuate inner edge 47a of the segment forms a continuation of the cylindrical wall of the casing. An oval adjustment slot 47b is formed through the medial portion of segment 47 having mounted therein a sleeve 48 through which the bolt 46 extends. A horizontally projecting yoke 49 is affixed to the medial left hand end of casing 41, straddling the external side of segment 47 and having mounted in the outer end thereof an adjustment screw 50, the inner end of which bears against segment 47 and determines the adjustment thereof. This screw, as shown, is equipped with a wing nut or handle 50a to facilitate adjustment. An oval shaped charging aperture 41c is formed medially through the top of casing 41 communicating with the periphery of rotor 42 and an oval discharge port 41d is formed through the bottom of casing 41 having association with a flared channel 47c formed in the opposed end of segment 47. A pair of radially disposed elongated inspection apertures 41e are formed through the right hand end of casing 41.

A small shallow, horizontal pan 41f is removably attached to the bottom of the rotor casing 41 disposed below the inclined edge at the left hand portion of the casing and adapted to catch any small particles of material which may work their way outwardly between the longitudinal edges of segment 47 and the accommodating slot of casing 41.

A material charging mechanism is mounted directly above the casing 41, shown as supported from an L-shaped bracket 51 which is bolted to the top of the casing-supporting bracket 40 and which carries a rectangular, vertical material chamber 52 in communication laterally with a large material hopper H disposed at the left thereof. Chamber 52 has a central circular aperture 52a through the bottom thereof, communicating with the charging aperture 41c of casing 41. A combined charging plunger and agitator 53 is vertically and medially disposed in chamber 52 having its upwardly extending shank mounted for oscillation and slidable reciprocation in a suitable casting or head 54, rigidly attached to the L bracket 51. The plunger 53 is urged to the extreme upward position illustrated in Fig. 3 by a coil compression spring 55 interposed between a collar 53a fixed to the medial portion of the shank and a seat afforded by a housing chamber 54a in the lower portion of the head. The medial portion of the shank of plunger 53 above collar 53a is provided with two or more spiral grooves 53b formed therein which are adapted to ride inwardly disposed pins or lugs 56a, provided by a fixed sleeve 56. The upper end of the shank of plunger 53 is rounded to form a tappet 53c which rides a tappet cam 57 fixed to a horizontal shaft 58 mounted in suitable bearings provided by the bifurcated upper end of the head 54. The outer end of shaft 58 has affixed thereto, a sprocket 59 which as shown, is driven by an endless chain 60 from a power takeoff pinion 61 mounted in the gear case G and projected from the right hand end thereof, as shown in Fig. 1. The plunger 53 terminates in its lower end in a charging head of slightly smaller diameter than the minor diameter of the charging aperture 41c of the casing 41 and as shown, carries a pair of spaced and crossed diametric agitator pins 53d disposed within chamber 52 various distances above the bottom of the plunger.

The charging chamber 52 communicates laterally with the bottom and trough portion of a large storage hopper H supported also from the upstanding attachment bracket 51 and having mounted therein a horizontal screw conveyor 62 aligned with the communicating aperture of charging chamber 52 and extending longitudinally of the machine. The outer projecting end of the shaft of screw conveyor 62 has fixed thereto, as shown, a driven sprocket 62a which is connected by an endless chain 63 with the driving sprocket 64a of a power takeoff shaft 64 mounted in the gear casing G and extending longitudinally of the machine from the left hand side of the case. As shown, power is supplied to drive the various power takeoff shafts mounted in the gear transmission case G by suitable means such as an electric motor M mounted below the rear and left hand portion of the main frame F and having a V-pulley connected by a V-belt 65 with the driven pulley 66 of the transmission mechanism.

To vary the spaced relationship of the measuring and dispensing mechanism X and particularly, its discharge relative to the line of tangency between crimping rolls 17 and 18, we provide simple adjustment mechanism for moving the retaining bed plate D upon which the mechanism X, the hopper H, the charging mechanism and the transmission mechanism, are mounted. To this end, a longitudinally and horizontally extending adjustment screw 67 is mounted below the main frame F journaled adjacent its right hand and outer end in a suitable bearing and threadedly engaging a heavy, depending lug 68 fixed to the central portion of the bed plate D. The outer and right hand end of adjustment screw 67 has a hand wheel 67a affixed thereto to facilitate turning.

*Operation*

In operation with the hopper H charged with granular or comminuted solid material and with the casing segment or scraper segment 47 properly adjusted for the texture and nature of the material to be packaged and with the bed plate D properly adjusted to suit the requirements of the films 13 and 14 utilized for packaging, the feeding of the films 13 and 14, the uniformly spaced dispensing of deposits upon the lower film 13 and the subsequent crimping of the two films and sealing of the major areas thereof about the pockets formed, are continuous. The lower film 13 travels across the horizontal platen 37 in the shallow channel 37a provided therein and is properly tensioned by pulling action from the crimping rolls 17 and 18, the friction on the trunnions 12a of spool 12 being adjusted properly to maintain the proper tension.

The material fed to the charging chamber 52 is agitated by the diametric agitating pins 53d in each reciprocation of the charging plunger 53. This is accomplished in the form of the apparatus illustrated by the oscillation of the plunger in its reciprocation through the pin and spiral engagement between the plunger and the fixed pins on the sleeve 56. The relatively loose material below plunger 53 in the downward stroke thereof, is pushed and packed into the appropriate radial cylinder 42a of the rotor which is synchronized therewith and the charged cylinder continued its revolutionary travel in the direction of the arrows as shown, in the drawings, the piston 44 of the cylinder being actuated by the cam slot and pin mechanism to protract the piston as the charged cylinder approaches the bottom and discharge port 41d of the casing 41. The material at the open ends of the respective cylinders 42a is confined after charging and until discharge thereof, by the inner peripheral wall of the adjustable segment 47 and in the expulsion of the material from the charged cylinders through discharge port 41d the channel 47c in cooperation with the discharge port 41d causes a quite uniform, dense, circular or slightly oval deposit to be made upon the travelling lower film 13.

Obvious with the circumferentially spaced, radially disposed cylinders of the rotor and with the driving speed of the rotor synchronized with the driving of the crimping rolls 17 and 18 and consequently with the travel of the films, the deposits are uniformly spaced longitudinally along the lower film 13. The upper film 14 is pulled at the same speed as film 13 by the action of the synchronized crimping rollers and is guided by guide roller 38 to enter between the substantially meshed portions of the crimping rolls in converging relationship to the lower film 13 containing the deposits. The registering pockets 18d and 17d of the two rolls are of somewhat larger area than the deposits of material to be packaged and accommodate such deposits in the crimping action permitting the balance of the area of the two strips to be crimped together while heated through the transfer of heat from rolls 17 and 18. The crimping action through the cooperating circumstantially spaced, longitudinal ribs 18b and channels 17b of the two rolls, seal the two strips together quite effectively about the material containing pockets formed while further sealing effect longitudinally of the strip and transversely of the first mentioned crimping, is effected by the circumferential ribs 18c of the upper roll and the circumferential channels 17c of the lower roll. This last mentioned crimping and sealing action quite positively excludes any leakage of air through the first mentioned crimping. In the crimping action the upper roll 18, journaled in its floating mounting, makes provision for slight variances in the uniform thickness of the strips utilized and will further accommodate strips varying in thickness within a range. The pulling or paying off of the strips 13 and 14 from the rolls in the embodiment disclosed, is accomplished by the co-action of the crimping rollers 17 and 18 which as has been stated, are driven in synchronization with the revolution of rotor 42.

Due to variations in the texture and stretchability of the strip material or film utilized, we discovered that it is desirable to make provision for slight adjustment of the spaced relationship between the point of discharge of the material and the tangential line of crimping between rolls 17 and 18. Accordingly, we provided the mounting of the charging, measuring and dispensing mechanism on the adjustable bed plate D with the screw 67 giving substantial micrometer adjustment. Thus, it is always possible within the range of suitable strip material utilized, to adjust the point of discharge of deposits to assure that the deposits will be properly aligned and received by pockets 17d and 18d, of the respective crimping rolls.

In the operation of our machine, the proper tensioning of the strips 13 and 14 is quite important and to this end, the split bearings or other suitable friction-applying means associated with the mounting of the film spools produces the required results.

A slight variance may be made in the measured amounts of material discharged by regulation of the casing or scraper sector 57, through manipulation of the adjustment screw 50. This variation is desirable in dispensing materials varying in size and viscosity.

From the foregoing description, it will be seen that we have provided a comparatively simple, highly efficient, continuous-operation machine for measuring, dispensing and film packaging small quantities of various materials and operative to form a very thin, hermetically sealed jacket surrounding the dispensed material.

From the foregoing description, it will also be seen that our invention includes not only a machine or apparatus for accomplishing improved unitary results, but includes also, a new method of measuring, dispensing and film packaging with sealed effect, small quantities of various materials. Our method as disclosed, consists essentially in moving a strip of film through a course which includes a horizontal section, then successively dispensing upon the strip during its travel through said horizontal section, uniformly spaced, measured deposits of the material and simultaneously moving a second strip of film at the same speed and superimposing the second strip in its travel, over a portion of the first strip containing the deposits and thereafter adhering, preferably by heat and crimping the two opposing surfaces of said two films together throughout substantial areas which surround the said deposits to form a sealed film jacket with the material in the pockets thereof. More specifically, the steps of measuring and dispensing the measured material comprise the charging successively of a series of radial cylinders in a rotor and the successive and subsequent discharging of the measured material by expelling the contents of the cylinders successively upon a film of material pulled below the rotor in horizontal position.

While the method and apparatus disclosed herein are particularly adaptable for use upon solid, comminuted or granular material, it has been found that they are also well adapted for measuring, dispensing and film-packaging semisolid material such as pastes and viscous semiliquid material such as suspensions and coagulations. The term "flowable material" as used hereafter in the claims comprehends granular or comminuted material; semisolid material having paste or jell consistency; and viscous liquids and semiliquids such as suspensions and coagulations or material which in comminuted or viscous semiliquid state is converted into solid form within the measuring cylinders and thereafter expelled as discs or wafers.

What is claimed is:

1. In a machine for measuring, dispensing and film-packaging powdered and granular material, a vertically disposed measuring and dispensing rotor journaled on a horizontal axis and provided with a series of radial charge-passages, having open outer ends disposed at the periphery of said rotor, charging mechanism mounted at the top of said rotor having a discharge communicable with only one of said charge passages at a time, a piston longitudinally movable in each of said charge passages, a substantially horizontal, planar film support disposed just beneath said rotor in close spaced relation to the periphery thereof, a material-guiding shoe element interposed between the bottom of said rotor and said film support and having a discharge aperture of somewhat greater length than the diameter of said charge passages, the bottom of said shoe being disposed in slight working clearance to the top of a film moved over said support, means for uniformly and longitudinally moving a flexible film of material over said support beneath said rotor, mechanism synchronized with said film-moving means for driving said rotor and cam-actuated means synchronized with said rotor for successively moving said several pistons outwardly at slow uniform speed in the cycle of operation between the horizontal position of each charging passage and the downwardly extending vertical position thereof, whereby with the cooperation of said shoe element, a uniform, substantially thin deposit of powdered or granular material is formed on the moving film without scattering or substantial dropping of the material in the dispensing thereof.

2. In a machine for measuring, dispensing and film-packaging powdered and granular material, a vertically disposed measuring and dispensing rotor journaled on a horizontal axis and provided with a series of radial charge-passages having open outer ends disposed at the periphery of said rotor, charging mechanism mounted at the top of said rotor having a discharge communicable with only one of said charge passages at a time, a piston longitudinally movable in each of said charge passages, a substantially horizontal, planar film support disposed just beneath said rotor in close spaced relation to the periphery thereof, means for longitudinally moving a flexible film of material at uniform speed over said support beneath said rotor, mechanism synchronized with said film-moving mechanism for driving said rotor at constant speed and mechanism synchronized with said rotor for successively moving said several pistons first inwardly in the upward movement of said radial charge passages to full charge-receiving position when said passages are disposed vertically upward and for uniformly moving said several pistons outwardly at uniform speed in the cycle of operation between the horizontal position of each charging passage and the downwardly extending vertical position thereof, whereby a uniform, substantially thin deposit of powdered or granular material is formed on the moving film without scattering or substantial dropping of the material in the dispensing thereof.

3. The structure set forth in claim 2 further characterized by a reciprocating charging plunger, substantially vertically disposed in said charging mechanism and substantially aligned with the discharge of said charging mechanism and reciprocating actuating mechanism synchronized with said rotor for reciprocating said plunger.

CLARK V. JOHNSTON.
IRENE M. JOHNSTON.

REFERENCES CITED

The following references are of record in the file of this patent:

UNITED STATES PATENTS

| Number | Name | Date |
|---|---|---|
| 1,069,083 | Gibson | July 29, 1913 |
| 1,485,141 | Macdonald | Feb. 24, 1924 |
| 1,625,461 | Files | Apr. 19, 1927 |
| 1,927,092 | Howard | Sept. 19, 1933 |
| 2,010,523 | McClatchie | Aug. 6, 1935 |
| 2,083,618 | Salfisberg | June 15, 1937 |
| 2,195,740 | Salfisberg | Apr. 2, 1940 |

FOREIGN PATENTS

| Number | Country | Date |
|---|---|---|
| 18,199 | Australia | June 27, 1934 |
| 394,489 | Great Britain | June 29, 1933 |